March 7, 1967 J. W. ANDREWS 3,307,231
APPARATUS FOR MAKING ELECTROTYPE PLATES
Filed April 8, 1963 3 Sheets-Sheet 1
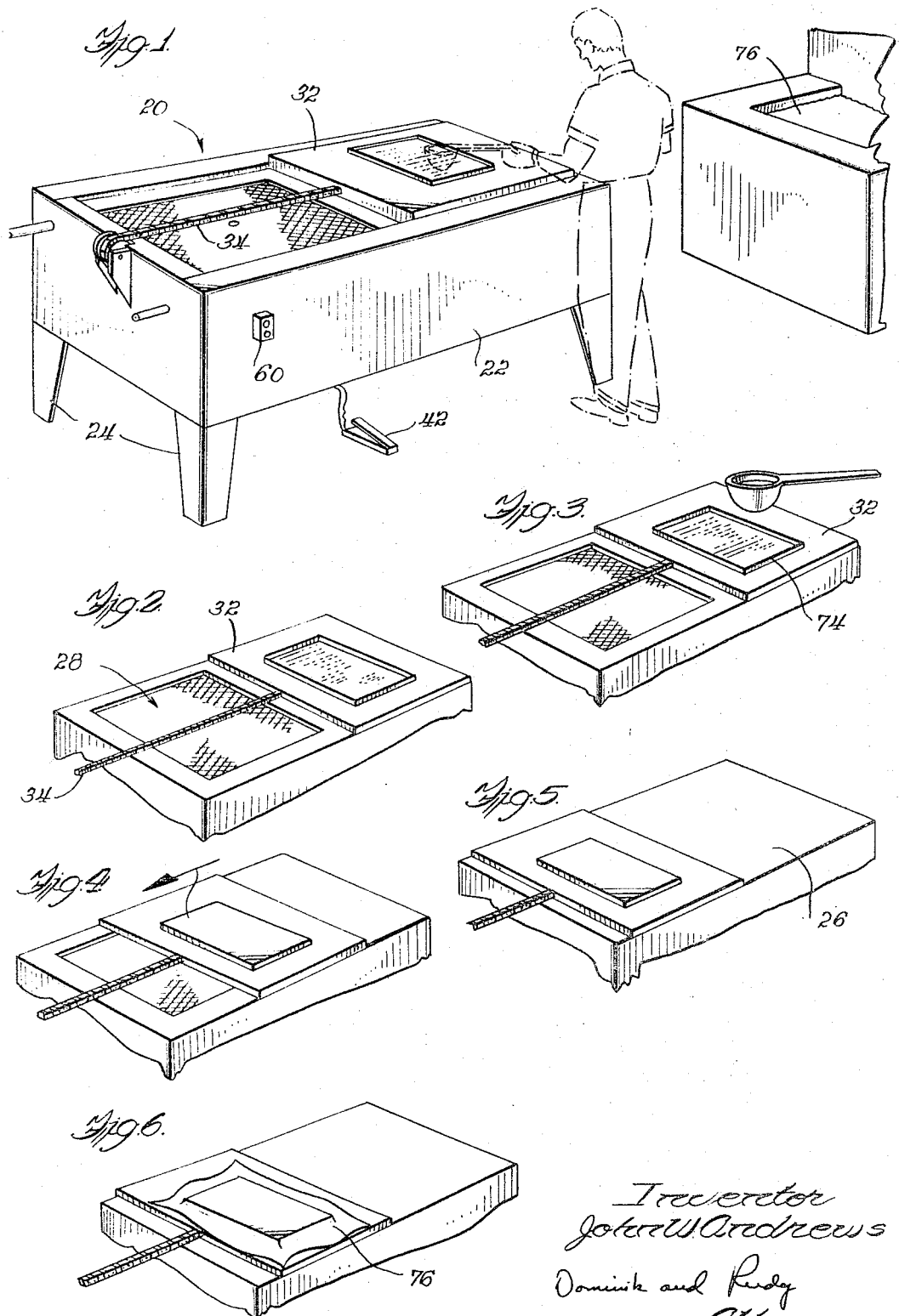

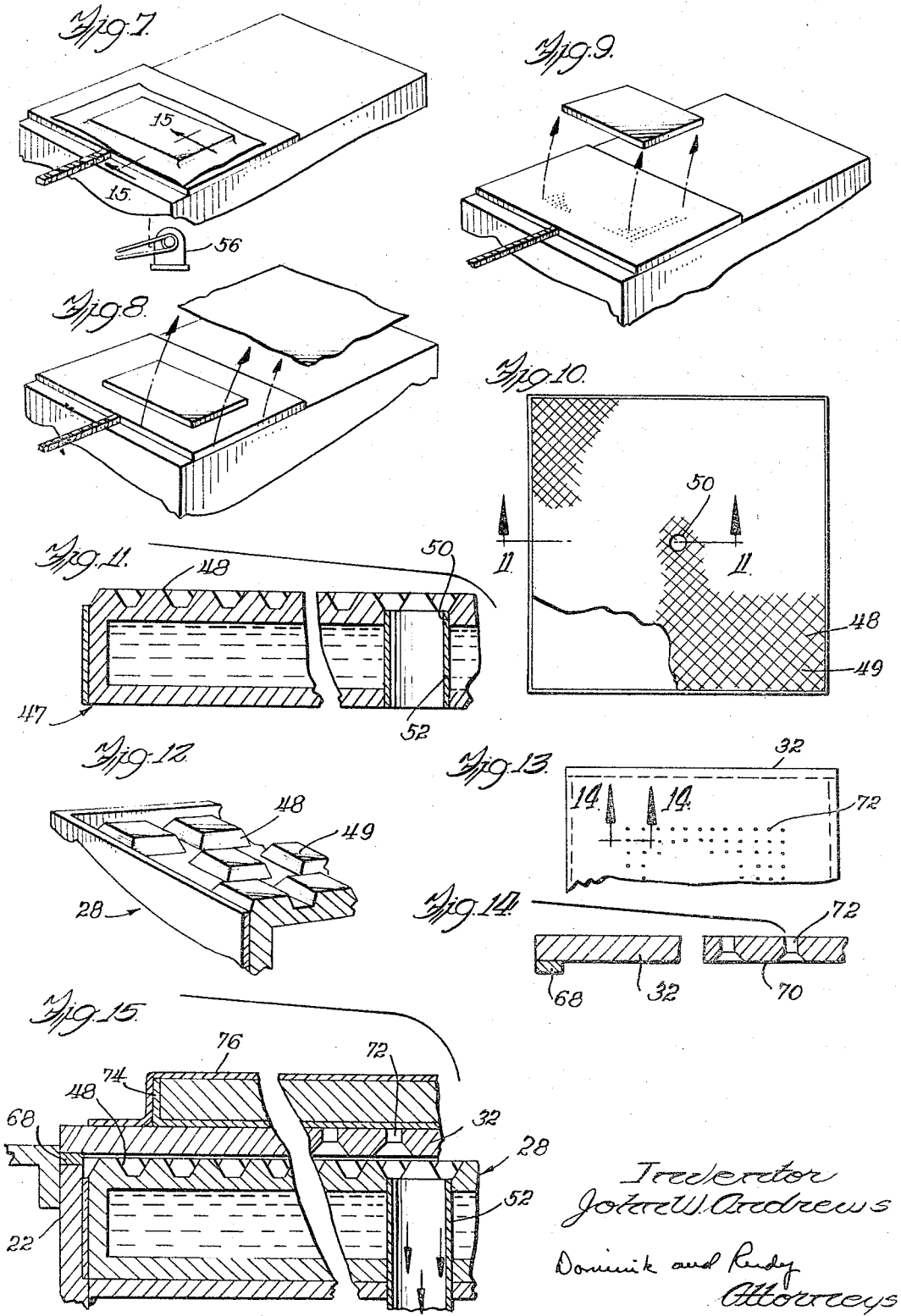

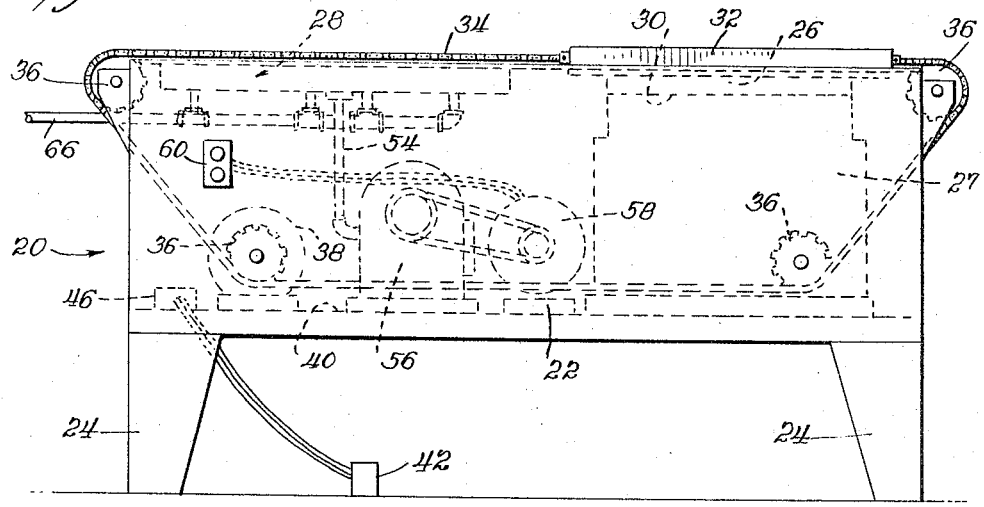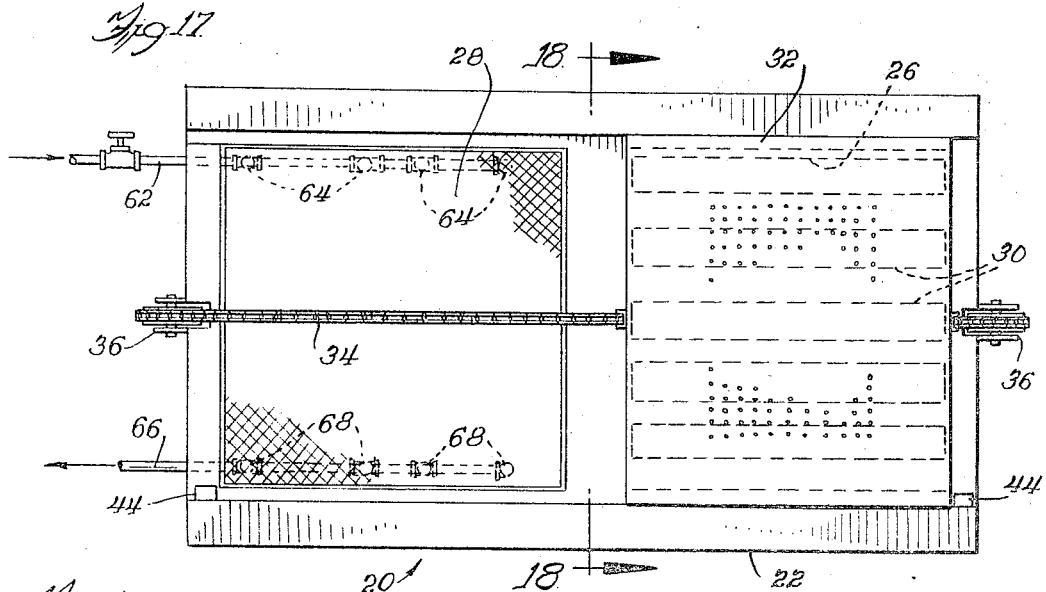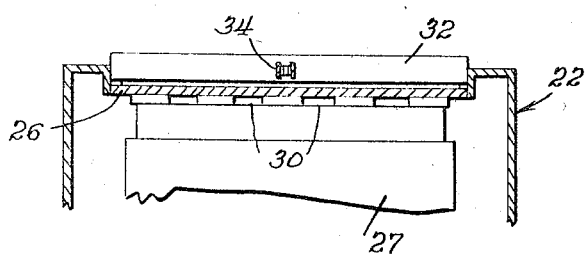

# United States Patent Office 3,307,231
Patented Mar. 7, 1967

3,307,231
APPARATUS FOR MAKING ELECTROTYPE PLATES
John W. Andrews, 1238 Oakmont, Flossmoor, Ill. 60422
Filed Apr. 8, 1963, Ser. No. 271,194
5 Claims. (Cl. 22—58)

This invention relates to apparatus for making an electrotype plate.

In the making of an electrotype plate, it is usual and/or necessary to cast back-up metal on the reverse, or non-printing surface of the plate shell to give it the degree of strength and stiffness as required for handling as well as for use in the printing press. The method and apparatus of the present invention results in certain advantages and benefits not generally attainable with known methods and apparatus of the prior art. More particularly, the method and apparatus of the present invention results in the production of an electrotype plate wherein the printing surface is not distorted or warped, which has a better density distribution in the back-up metal, wherein less finishing is required, and make-over almost eliminated, wherein a better printing surface is developed because of a slight convexity given to the printing surface to thereby eliminate high points, or edges in certain areas of the plate, and wherein fabrication time is greatly reduced.

Briefly, the apparatus of the invention includes a heating station, a cooling station, and a perforated transfer plate positioned for convenient movement between the two stations. The cooling station includes a grid-like structure adapted for application of vacuum to the underside of the transfer plate. The grid-like structure is arranged for cooling by exposure of the lower surface to a cold circulating medium. The method of the invention includes the steps of tinning an electrotype shell and placing the electrotype shell on a transfer plate which is positioned at a heating station, with the printing surface of the shell in contact with the surface of the transfer plate. The edges of the electrotype shell are bent upwardly so that molten metal may be poured upon and contained over the entire area of the electrotype shell. After metal pouring, the transfer plate is moved to the cooling station, where the transfer plate is drawn into snug engagement with the grid-like structure due to the vacuum condition under the transfer plate. Rapid cooling is thus achieved at the cooling station, which not only improves the quality of the finished product, but greatly speeds up production.

The main object of this invention is to provide an improved method and apparatus for making an electrotype plate.

A more specific object is to provide an improved method and apparatus for application of a cast metal backing to an electrotype plate.

Another specific object is to provide a method and apparatus for producing electrotype plates having printing surfaces free of distortion or warpage.

A further object is to provide a method and apparatus for producing electrotype plates wherein less finishing is required and make-over almost eliminated.

Still another object is to provide a method and apparatus for producing electrotype plates wherein a better printing surface is developed.

A further object is to provide a method and apparatus for producing electrotype plates in a rapid and efficient manner.

These and further objects and features of the invention will become more apparent from the following description and accompanying drawings wherein:

FIG. 1 is a perspective-like view of apparatus embodying the principle of the invention;

FIG. 2 is a fragmentary view similar to FIG. 1 and illustrating a first step in the method of the invention, i.e., wherein an electrotype shell is in position at a heating station;

FIG. 3 is the same as FIG. 2 but showing a metal pouring step;

FIG. 4 is the same as FIG. 3 but showing a transfer plate in the process of being moved from the heating station to a cooling station;

FIG. 5 is the same as FIG. 4 but showing the transfer plate at the cooling station;

FIG. 6 is the same as FIG. 5 but showing an air impervious blanket in position over the transfer plate;

FIG. 7 is the same as FIG. 6 but showing conditions upon application of a vacuum to the transfer plate;

FIG. 8 is the same as FIG. 7 but showing a blanket removal step;

FIG. 9 is the same as FIG. 8, but showing removal of a cast electrotype plate from the transfer plate;

FIG. 10 is a plan view of a grid-like structure used in apparatus of the invention;

FIG. 11 is a broken and enlarged section view generally as seen along line 11—11 in FIG. 10;

FIG. 12 is a fragmentary perspective-like view of the grid-like structure of FIG. 10;

FIG. 13 is a partial plan view of the transfer plate shown in FIG. 4;

FIG. 14 is a broken and enlarged section view generally as seen along line 14—14 in FIG. 13;

FIG. 15 is a broken and enlarged section view generally as seen along line 15—15 in FIG. 7;

FIG. 16 is a side view of apparatus of the invention, as shown in FIG. 16;

FIG. 17 is a top plan view of the same; and

FIG. 18 is a section view generally as seen along line 18—18 in FIG. 17.

Referring now to the drawings, and more particularly FIGS. 1, 16 and 17, numeral 20 identifies apparatus embodying the principles of the invention, which apparatus includes a rectangular enclosure, or housing 22 supported in spaced relation from the floor at each corner by legs 24. The upper portion of the enclosure 22 is arranged to provide a heating station defined by a hot plate 26, and a cooling station defined by a cooling plate assemblage 28 in juxtaposition, and substantially in the same horizontal plane with the hot plate 26. Means 27 are provided to maintain the temperature of the hot plate at approximately 500° F.; such temperature may vary, of course, depending upon the metal of the electrotype shell and back-up metal, which means may include the use of a flame, a hot circulatory medium, e.g., liquid, vapor, etc., or an electrically heated element. By way of example, a series of electrical heating elements 30 are used in the illustrated apparatus.

A transfer plate 32, made of good heat conductive material, such as aluminum, is arranged for sliding movement between the heating and cooling stations, and is motivated by an endless drive chain 34, the ends of which are centrally connected to opposite sides of the transfer plate. The chain 34 is guidingly supported by sprockets 36, two of which are rotatably mounted upon upper exterior portions of the housing 22, while two are rotatably mounted within the housing, as best seen in FIG. 16.

A motor means 38, supported upon a shelf 40 in the housing 22, is adapted to drive the chain 34 in either direction of movement, whereby the transfer plate 32 will be shifted from the heating station to the cooling station, or vice versa. A foot control switch means 42 is arranged for starting motor operation, while limit switches 44, positioned at desired end of stroke movement of the transfer plate 32, are arranged to terminate operation of the motor means 38. The circuit of the switches 42 and 44 may be directed to a control box 46, having the necessary electrical elements, i.e., relays, etc., to effect desired motor operation.

The cooling plate assemblage 28 which has the shape of a rectangular box 47, includes a grid-like structure in the form of a waffle plate upper surface 48 having truncated rectangular protrusions 49 with flat upper surfaces in a given plane, and a centrally arranged hole 50 with a sleeve 52 opening into and extending between the waffle plate surface 48 and the bottom of the box 47. A pipe 54 connects the sleeve 52 with a vacuum pump 56, supported on the shelf 40, which pump is driven by a motor 58 controlled by an on-off switch 60. Operation of the pump 56 will evacuate air in the network of the waffle plate when the latter is covered by the transfer plate 32. The interior of the box 47 is arranged to be flushed with a cooling medium, such as water, to thus maintain the temperature of the waffle plate surface 48 at a degree which affords rapid heat transfer from the transfer plate, as will be more apparent hereinafter. Toward this end, an inlet pipe 62 is arranged to conduct water to the interior of the box 47 via holes 64, while an outlet pipe 66 is arranged to conduct water from the interior of the box 47 via holes 68.

The transfer plate 32 is supported upon runners 68 which slide upon an upper edge surface of the housing 22, said arrangement being such that the under surface 70 of the transfer plate is in sliding engagement with the upper surface of the hot plate 26, and is in closely spaced relation, say .020 inch, from the upper surface of the waffle plate surface 48, as best seen in FIG. 15. A plurality of symmetrically arranged openings, or holes 72, chamfered at the lower end, are formed in the transfer plate 32. It will be appreciated that when air is evacuated from the volume between the transfer plate 32 and the upper surface of the hot plate assemblage, atmospheric pressure will bend, or otherwise flex the transfer plate into engagement with the protrusions 49. Such bending, or flexing, will result in a slight concavity of the upper surface of the transfer plate, which will improve the quality of the electrotype plate being made with the apparatus.

In utilizing the apparatus above described for the back-up metal casting of an electrotype plate, reference may be had to FIGS. 2 to 9. An electrotype shell 74, having the edges bent upwardly to form a pan, is placed upon the transfer plate 32. The printing surface of the shell being in contact with the transfer plate, will be heated via heat transfer through the transfer plate from the hot plate 26. The shell being made of a copper compound, will have a tin coating on the upper surface for soldering or joining with the leaded or matrix material to be cast thereupon. A flux material is placed upon the tin surface, as is usual in soldering operations. A flame is manually passed over the tinned shell to cause a melting of the tin.

Molten metal is scooped from a pot, or reservoir 76 and poured in the heated electrotype shell pan 74 to desired depth, after which the transfer plate is moved to the cooling station atop the cooling plate assemblage 28. Vacuum, or such atmospheric condition at the waffle plate surface, will cause atmospheric pressure to bear down upon the shell pan with the molten metal thereupon, so that the lower surface of the shell pan is in snug engagement with the transfer plate and the latter is in contact with the waffle projections 49. In essence, a pressure differential is established between the top of the metal loaded shell and the lower surface of the transfer sheet.

In event the shell pan 74 is not large enough to cover all the holes 72, a rubber blanket, or sheet 76 is placed over the transfer plate and the shell pan 74, as seen in FIG. 6. In such manner, air flow through the uncovered holes will be prevented and a good vacuum will be maintained underneath the shell pan. After sufficient time has elasped to cause a hardening of the cast metal, the blanket 76 is removed, and the electrotype plate is lifted off of the transfer plate. It will be found in practice that such a cooling time period will be very short, say, no more than thirty seconds. This is a substantial savings in cooling time as required by prior art apparatus.

In the event higher production is required or desired, the apparatus of the invention may be modified to incorporate a centrally arranged heating station and two cooling stations, one provided on each side of the heating station. With such an arrangement, one electrotype shell can be in the process of having the metal poured thereupon, while a previously cast shell can be simultaneously positioned at one of the cooling stations. In such manner, the production rate may be approximately doubled with only the addition of one more cooling station.

It will be seen that the slight convexity of the printing surface of the electrotype plate, due to the flexing of the transfer plate into engagement with the protrusions 49, will make the cast plate better suited for printing full areas without the need for touchup of the printing surface to eliminate high points particularly about the edges of a solid figure. Furthermore, subsequent machining operations, as often required on electrotype plates having back-up metal cast by prior art apparatus, will be substantially reduced.

In short, the method and apparatus of the invention will be seen to satisfy all of the objectives set forth hereinbefore. While the method and apparatus have been described for the making of electrotype plate for use in printing presses, obviously the principles thereof can find application in the manufacture of various other flat articles having a cast metal back-up construction.

The foregoing description has been given in detail without thought of limitation since the inventive principles involved are capable of assuming other forms without departing from the spirit of the invention or the scope of the following claims.

What is claimed is:

1. Apparatus for casting back-up metal on an electrotype shell, comprising a heating station, a cooling station, and a perforated transfer plate arranged for slidable movement between said stations, said cooling station having a rectangular box-like shape, the upper surface of which is formed to provide a waffle plate configuration, said box-like shape having a sleeve extending from the upper surface for evacuation of air from the upper surface, and means to circulate a cooling medium through the box-like shape.

2. Apparatus for casting back-up metal on an electrotype shell comprising a heating station, a cooling station, and a flat perforated transfer plate arranged for slidable movement between said stations, said cooling station having a cooling plate assemblage formed to provide a plurality of protrusions defining a waffle plate configuration, said protrusions each having a flat surface, the flat surfaces of all the protrusions lying in a given plane, a sleeve extending from the upper surface of the cooling plate assemblage for evacuation of air from between the protrusions, inlet and outlet means for circulation of cooling medium through the cooling plate assemblage, and runners arranged for spacing the lower surface of the transfer plate a given distance from the top of said protrusions.

3. Apparatus for casting back-up metal on an electrotype shell, comprising a heating station including electrical heating elements, a cooling station in juxtaposition with said heating station, a flat, perforated heat conducting transfer plate, and means to slidably move said transfer plate between said stations, said cooling station having a cooling plate assemblage which is hollow and has an upper surface formed to provide a plurality of protrusions defining a waffle plate configuration, said protrusions each having a flat surface, the flat surfaces of all the protrusions lying in a substantially flat plane, a sleeve extending between the upper and lower surfaces of the cooling plate assemblage for evacuation of air from between the protrusions, inlet and outlet means for circulation of cooling medium through the cooling plate assemblage, and runners arranged for spacing the lower surface of the transfer plate a given distance from the top of said protrusions.

4. Apparatus for casting back-up metal on an electrotype shell according to claim 3, wherein said transfer plate moving means includes an endless drive chain, the ends of which are connected to opposite sides of the transfer plate, and motor means for moving said chain.

5. Apparatus for casting back-up metal on an electrotype shell according to claim 4, wherein limit switches are arranged for operation by end of stroke movement by the transfer plate, for stopping operation of the motor means.

References Cited by the Examiner

UNITED STATES PATENTS

| 1,219,289 | 3/1917 | Gounley | 22—58 |
| 1,650,404 | 11/1924 | Walsh | 101—395 |
| 2,200,536 | 5/1940 | Bungay | 101—401.3 |
| 2,504,080 | 4/1948 | Myers | 22—203 |
| 2,646,601 | 7/1953 | Jung | 22—58 |
| 2,762,098 | 12/1953 | Bishop | 22—204 |
| 2,826,143 | 1/1954 | Muse | 101—395 |
| 2,915,797 | 12/1959 | Hoehl | 22—204 |
| 2,920,360 | 1/1960 | Strobel | 22—58 |

J. SPENCER OVERHOLSER, *Primary Examiner.*

R. S. ANNEAR, *Assistant Examiner.*